United States Patent
Lee et al.

(10) Patent No.: US 10,774,160 B2
(45) Date of Patent: Sep. 15, 2020

(54) SUPPORTED HYBRID CATALYST SYSTEM FOR ETHYLENE SLURRY POLYMERIZATION AND METHOD FOR PREPARING ETHYLENE POLYMER WITH THE CATALYST SYSTEM

(71) Applicant: LG CHEM, LTD., Seoul (KR)

(72) Inventors: Ye Jin Lee, Daejeon (KR); Yi Young Choi, Daejeon (KR); Ki Soo Lee, Daejeon (KR); Se Young Kim, Daejeon (KR); Sung Min Lee, Daejeon (KR); Chang Woan Han, Daejeon (KR); Soon Ho Sun, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 15/748,798

(22) PCT Filed: Feb. 6, 2017

(86) PCT No.: PCT/KR2017/001289
§ 371 (c)(1),
(2) Date: Jan. 30, 2018

(87) PCT Pub. No.: WO2017/155211
PCT Pub. Date: Sep. 14, 2017

(65) Prior Publication Data
US 2019/0010256 A1 Jan. 10, 2019

(30) Foreign Application Priority Data

Mar. 11, 2016 (KR) .................. 10-2016-0029841
Feb. 3, 2017 (KR) .................. 10-2017-0015808

(51) Int. Cl.
| | | |
|---|---|---|
| C08F 4/653 | (2006.01) | |
| C08F 4/6592 | (2006.01) | |
| C08F 10/02 | (2006.01) | |
| C08F 110/02 | (2006.01) | |
| C08L 23/08 | (2006.01) | |
| B01J 31/22 | (2006.01) | |
| C08F 4/02 | (2006.01) | |
| C08F 4/659 | (2006.01) | |

(52) U.S. Cl.
CPC ....... *C08F 4/65927* (2013.01); *B01J 31/2295* (2013.01); *C08F 4/02* (2013.01); *C08F 10/02* (2013.01); *C08F 110/02* (2013.01); *C08L 23/0815* (2013.01); *B01J 2231/12* (2013.01); *B01J 2531/0225* (2013.01); *C08F 4/65908* (2013.01); *C08F 4/65912* (2013.01); *C08F 4/65916* (2013.01); *C08F 4/65925* (2013.01); *C08F 2420/06* (2013.01); *C08F 2500/02* (2013.01); *C08F 2500/06* (2013.01); *C08F 2500/12* (2013.01)

(58) Field of Classification Search
CPC .............. C08F 4/65804; C08F 4/65927; C08F 4/65925; C08F 210/16; C08L 23/0815
See application file for complete search history.

(56) References Cited

U.S. PATENT DOCUMENTS

| | | |
|---|---|---|
| 5,032,562 A | 7/1991 | Lo et al. |
| 5,525,678 A | 6/1996 | Mink et al. |
| 5,719,241 A | 2/1998 | Razavi et al. |
| 5,914,289 A | 6/1999 | Razavi |
| 6,258,912 B1 | 7/2001 | Howard et al. |
| 6,300,437 B1 | 10/2001 | Howard et al. |
| 6,855,783 B2 | 2/2005 | Gauthier et al. |
| 9,988,469 B2 * | 6/2018 | Song .................. C08F 4/64 |
| 2005/0159300 A1 | 7/2005 | Jensen et al. |
| 2008/0257854 A1 | 10/2008 | Stephenne et al. |
| 2010/0249346 A1 | 9/2010 | Schiendorfer et al. |
| 2014/0128563 A1 * | 5/2014 | McDaniel ......... C08F 210/14 526/348.5 |
| 2014/0378720 A1 | 12/2014 | Wu et al. |
| 2016/0237188 A1 | 8/2016 | Hong et al. |
| 2017/0029538 A1 | 2/2017 | Song et al. |

FOREIGN PATENT DOCUMENTS

| | | |
|---|---|---|
| EP | 2003166 A1 | 12/2008 |
| EP | 1963347 B1 | 10/2011 |
| EP | 3168243 A1 | 5/2017 |
| JP | 04-213305 A | 8/1992 |
| JP | 06-322014 A | 11/1994 |
| JP | 07-304830 A | 11/1995 |
| JP | 07-309909 A | 11/1995 |
| JP | 2008-525275 A | 7/2008 |
| JP | 4234673 B2 | 3/2009 |

(Continued)

OTHER PUBLICATIONS

Alexakis et al., "Mild protection and deprotection of alcohols as ter-butyl ethers in the field of pheromone synthesis", Tetrahedron Letters, vol. 29, No. 24, pp. 2951-2954 (1988).

Zheng et al. "Novel Polyolefin Nanocomposites: Synthesis and Characterizations of Metallocene-Catalyzed Polyolefin Polyhedral Oligomeric Silsesquioxane Copolymers", Macromolecules, vol. 34, pp. 8034-8039 (2001).

(Continued)

*Primary Examiner* — Caixia Lu

(74) *Attorney, Agent, or Firm* — Dentons US LLP

(57) ABSTRACT

The present invention relates to a supported hybrid catalyst system for ethylene slurry polymerization and a method for preparing ethylene polymer therewith. The supported hybrid catalyst system according to the present invention may exhibit high activity during ethylene slurry polymerization, and enables preparation of an ethylene polymer having a narrow molecular weight distribution but excellent processability.

5 Claims, No Drawings

(56) References Cited

FOREIGN PATENT DOCUMENTS

| KR | 10-1997-0065544 A | 10/1997 |
|---|---|---|
| KR | 10-2001-0109794 A | 12/2001 |
| KR | 10-2006-0006920 A | 1/2006 |
| KR | 10-2012-0052904 A | 5/2012 |
| KR | 10-1154508 B1 | 6/2012 |
| KR | 10-2015-0045368 A | 4/2015 |
| KR | 10-2015-0058020 A | 5/2015 |
| KR | 10-2015-0139462 A | 12/2015 |
| KR | 10-2016-0072068 A | 6/2016 |
| WO | 2004-076502 A1 | 9/2004 |
| WO | 2011-002498 A1 | 1/2011 |
| WO | 2016-036204 A1 | 3/2016 |

OTHER PUBLICATIONS

International Search Report for PCT/KR2017/001289, dated May 19, 2017.
Written Opinion of the ISA from PCT/KR2017/001289, dated May 19, 2017.

\* cited by examiner

SUPPORTED HYBRID CATALYST SYSTEM FOR ETHYLENE SLURRY POLYMERIZATION AND METHOD FOR PREPARING ETHYLENE POLYMER WITH THE CATALYST SYSTEM

TECHNICAL FIELD

The present invention relates to a supported hybrid catalyst system for ethylene slurry polymerization and a method for preparing an ethylene polymer therewith.

CROSS-REFERENCE TO RELATED APPLICATION

This application is the national stage of International Application No. PCT/KR2017/001289 filed on Feb. 6, 2017, and claims the benefit of Korean Application No. 10-2016-0029841 filed on Mar. 11, 2016, and Korean Patent Application No. 10-2017-0015808 filed on Feb. 3, 2017, all of which are hereby incorporated by reference in their entirety for all purposes as if fully set forth herein.

BACKGROUND OF ART

Olefin polymerization systems are divided into Ziegler-Natta and metallocene catalyst systems, and these two catalyst systems have been developed corresponding to their respective characteristics.

The Ziegler Natta catalyst has been widely applied in existing commercial processes since it was invented in the fifties, but since it is a multi-site catalyst with several active sites, it is characterized by a wide molecular weight distribution of a polymer, and is limited in terms of securing of desired properties due to non-uniform composition distribution of comonomers. Particularly, since a propylene polymer prepared using the Ziegler-Natta catalyst has a high xylene soluble content (for example, greater than 5 wt %), when a Ziegler-Natta catalyst is used, it is difficult to obtain a propylene polymer with a low melting point (Tm).

Meanwhile, the metallocene catalyst consists of a main catalyst, of which a main component is a transition metal compound, and a cocatalyst, which is an organometal compound including aluminum as the main component, and such a catalyst is a homogeneous complex catalyst and a single site catalyst. Thus, the metallocene catalyst enables formation of a polymer with a narrow molecular weight and a uniform comonomer composition distribution. Further, the metallocene catalyst can change the stereoregularity, copolymerization property, molecular weight, crystallinity, etc. according to modification of the ligand structure of the catalyst and change of polymerization conditions.

U.S. Pat. No. 5,032,562 (1991 Jul. 16) describes a method for preparing a polymerization catalyst by supporting two different transition metal catalysts on one carrier. This is a method of producing a bimodal distribution polymer by supporting a titanium (Ti)-based Ziegler-Natta catalyst producing high molecular weight and a zirconium (Zr)-based metallocene catalyst producing low molecular weight on one carrier, and has disadvantages in that the supporting process is complicated, and polymer morphology is deteriorated due to the cocatalyst.

U.S. Pat. No. 5,525,678 (1996 Jun. 11) describes a method of using a catalyst system for olefin polymerization that simultaneously supports a metallocene compound and a non-metallocene compound on a carrier, thus simultaneously polymerizing a high molecular weight polymer and a low molecular weight polymer. It has disadvantages in that the metallocene compound and the non-metallocene compound should be separately supported, and the carrier should be pretreated with many compounds for supporting.

U.S. Pat. No. 5,914,289 (1996 Jun. 22) describes a method of controlling the molecular weight and molecular weight distribution of a polymer using metallocene catalysts supported on each carrier, but a large amount of solvent is required when preparing the supported catalyst and a long preparation time is required, and the used metallocene catalysts should be respectively supported on a carrier, which is inconvenient.

Korean Patent Application No. 10-2003-0012308 (2003 Feb. 27) discloses a method of controlling molecular weight distribution by supporting a binuclear metallocene catalyst and a mononuclear metallocene catalyst on a carrier together with an activator, and polymerizing while changing the combinations of catalysts in the reactor. However, this method is limited in terms of the simultaneous realization of the properties of each catalyst, and has disadvantages in that the metallocene catalyst part is isolated from the carrier component of the finished catalyst to induce fouling in the reactor.

Therefore, in order to solve the above problems, there is a continued demand for a method for preparing a supported metallocene catalyst with excellent activity in a convenient way to prepare a polyolefin with desired properties.

DETAILED DESCRIPTION OF THE INVENTION

Technical Problem

It is an object of the present invention to provide a supported hybrid catalyst system that may exhibit high activity during ethylene slurry polymerization, and enables the preparation of an ethylene polymer having a narrow molecular weight distribution but excellent processability It is another object of the present invention to provide a method for preparing an ethylene polymer with the catalyst system.

Technical Solution

According to the present invention, a supported hybrid catalyst system for ethylene slurry polymerization including a carrier and two or more kinds of metallocene compounds supported on the carrier, wherein the metallocene compounds include a compound represented by the following Chemical Formula 1, and one or more kinds of compounds selected from the group consisting of compounds represented by the following Chemical Formula 2 and Chemical Formula 3, is provided.

[Chemical Formula 1]

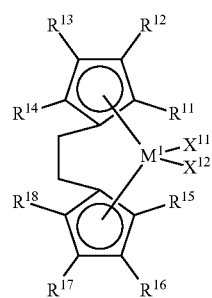

In Chemical Formula 1, $M^1$ is Group 4 transition metal;

$X^{11}$ and $X^{12}$ are identical to or different from each other, and are each independently a halogen, or a C1-20 alkyl, C2-20 alkenyl, C6-20 aryl, nitro, amido, C1-20 alkylsilyl, C1-20 alkoxy, or C1-20 sulfonate group;

$R^{11}$, $R^{12}$, $R^{15}$, and $R^{16}$ are identical to or different from each other, and are each independently hydrogen or a C1-20 alkyl; and $R^{13}$, $R^{14}$, $R^{17}$, and $R^{18}$ are identical to or different from each other, and are each independently hydrogen or a C1-20 alkyl, or two or more neighboring groups of the $R^{13}$ and $R^{14}$, and $R^{17}$ and $R^{18}$, may be connected to each other to form a substituted or unsubstituted aliphatic or aromatic ring.

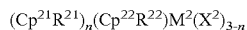   [Chemical Formula 2]

In Chemical Formula 2, $M^2$ is Group 4 transition metal;

$Cp^{21}$ and $Cp^{22}$ are identical to or different from each other, and are each independently one selected from the group consisting of cyclopentadienyl, indenyl, 4,5,6,7-tetrahydro-1-indenyl, and fluorenyl radicals, which may be substituted with a C1-20 hydrocarbon;

$R^{21}$ and $R^{22}$ are identical to or different from each other, and are each independently hydrogen, or a C1-20 alkyl, C1-10 alkoxy, C2-20 alkoxyalkyl, C6-20 aryl, C6-10 aryloxy, C2-20 alkenyl, C7-40 alkylaryl, C7-40 arylalkyl, C8-40 arylalkenyl, or C2-10 alkynyl;

$X^2$ is a halogen atom, or a C1-20 alkyl, C2-10 alkenyl, C7-40 alkylaryl, C7-40 arylalkyl, C6-20 aryl, substituted or unsubstituted C1-20 alkylidene, substituted or unsubstituted amino, C2-20 alkylalkoxy, or C7-40 arylalkoxy; and n is 1 or 0.

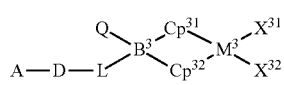   [Chemical Formula 3]

In Chemical Formula 3,

A is hydrogen, a halogen, or a C1-20 alkyl, C2-20 alkenyl, C6-20 aryl, C7-20 alkylaryl, C7-20 arylalkyl, C1-20 alkoxy, C2-20 alkoxyalkyl, C3-20 heterocycloalkyl, or C5-20 heteroaryl group;

D is —O—, —S—, —N(R)—, or —Si(R)(R')—, and R and R' are identical to or different from each other and are each independently hydrogen, a halogen, or a C1-20 alkyl, C2-20 alkenyl, or C6-20 aryl group;

L is a C1-10 linear or branched alkylene group;

$B^3$ is carbon, silicon, or germanium;

Q is hydrogen, a halogen, or a C1-20 alkyl, C2-20 alkenyl, C6-20 aryl, C7-20 alkylaryl, or C7-20 arylalkyl;

$M^3$ is a Group 4 transition metal;

$X^{31}$ and $X^{32}$ are identical to or different from each other, and are each independently a halogen, or a C1-20 alkyl, C2-20 alkenyl, C6-20 aryl, nitro, amido, C1-20 alkylsilyl, C1-20 alkoxy, or C1-20 sulfonate group;

$Cp^{31}$ and $Cp^{32}$ are identical to or different from each other, and are each independently represented by one of the following Chemical Formula 4a, Chemical Formula 4b, or Chemical Formula 4c, provided that both $Cp^{31}$ and $Cp^{32}$ are not represented by Chemical Formula 4c.

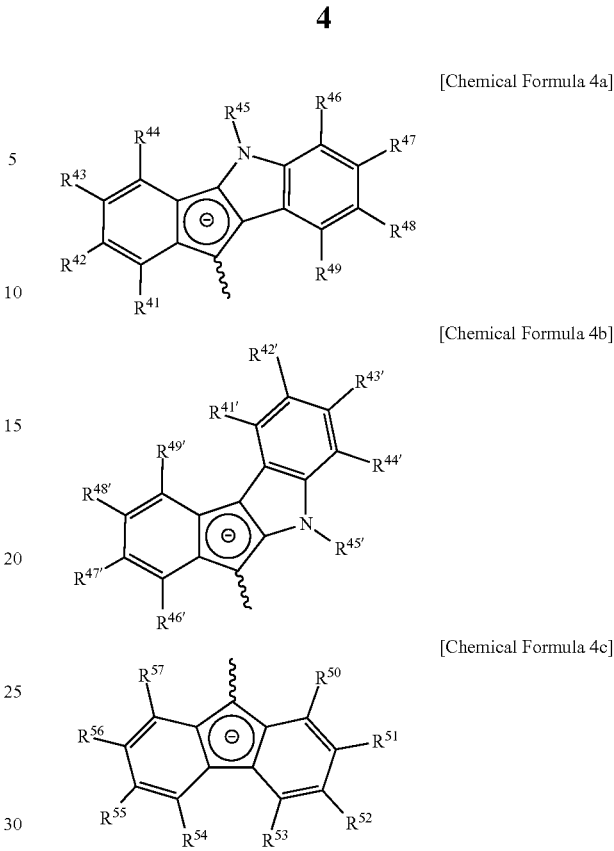

In Chemical Formula 4a, 4b, and 4c, $R^{41}$ to $R^{57}$ and $R^{41'}$ to $R^{49'}$ are identical to or different from each other, and are each independently hydrogen, a halogen, a C1-20 alkyl, a C2-20 alkenyl, a C1-20 alkylsilyl, a C1-20 silylalkyl, a C1-20 alkoxysilyl, a C1-20 alkoxy, a C6-20 aryl, a C7-20 alkylaryl, or a C7-20 arylalkyl; and two or more neighboring groups of $R^{50}$ to $R^{57}$ may be connected to each other to form a substituted or unsubstituted aliphatic or aromatic ring.

Further, according to the present invention, a method for preparing an ethylene polymer including the step of slurry polymerization of olefin monomers including ethylene in the presence of the above-described supported hybrid catalyst system is provided.

Hereinafter, a supported hybrid catalyst system for ethylene slurry polymerization and a method for preparing an ethylene polymer therewith according to the embodiments of the present invention will be explained in more detail.

First of all, technical terms in the present specification are only for mentioning specific embodiments, and they are not intended to restrict the present invention unless there is a particular mention about them.

Also, the singular expressions used herein may include the plural expressions unless they are differently expressed contextually. The meaning of the term "include" used in the specification embodies specific characteristics, areas, essences, steps, actions, elements, and/or components, and does not exclude existence or addition of other specific characteristics, areas, essences, steps, actions, elements, components, and/or groups.

I. Supported Hybrid Catalyst System for Ethylene Slurry Polymerization

According to one embodiment of the invention, a supported hybrid catalyst system for ethylene slurry polymerization including a carrier and two or more kinds of metallocene compounds supported on the carrier, wherein the metallocene compounds include a compound represented by the following Chemical Formula 1, and one or more kinds of compounds selected from the group consisting of compounds represented by the following Chemical Formula 2 and Chemical Formula 3, is provided.

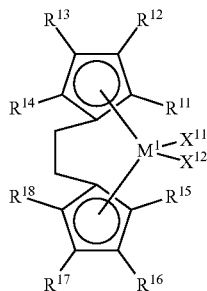

[Chemical Formula 1]

In Chemical Formula 1, $M^1$ is Group 4 transition metal;

$X^{11}$ and $X^{12}$ are identical to or different from each other, and are each independently a halogen, or a C1-20 alkyl, C2-20 alkenyl, C6-20 aryl, nitro, amido, C1-20 alkylsilyl, C1-20 alkoxy, or C1-20 sulfonate group;

$R^{11}$, $R^{12}$, $R^{15}$, and $R^{16}$ are identical to or different from each other, and are each independently hydrogen or a C1-20 alkyl; and $R^{13}$, $R^{14}$, $R^{17}$, and $R^{18}$ are identical to or different from each other, and are each independently hydrogen or a C1-20 alkyl, or two or more neighboring groups of the $R^{13}$ and $R^{14}$, and $R^{17}$ and $R^{18}$, may be connected to each other to form a substituted or unsubstituted aliphatic or aromatic ring.

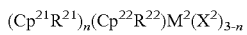

[Chemical Formula 2]

In Chemical Formula 2, $M^2$ is Group 4 transition metal;

$Cp^{21}$ and $Cp^{22}$ are identical to or different from each other, and are each independently one selected from the group consisting of cyclopentadienyl, indenyl, 4,5,6,7-tetrahydro-1-indenyl, and fluorenyl radicals, which may be substituted with a C1-20 hydrocarbon;

$R^{21}$ and $R^{22}$ are identical to or different from each other, and are each independently hydrogen, or a C1-20 alkyl, C1-10 alkoxy, C2-20 alkoxyalkyl, C6-20 aryl, C6-10 aryloxy, C2-20 alkenyl, C7-40 alkylaryl, C7-40 arylalkyl, C8-40 arylalkenyl, or C2-10 alkynyl;

$X^2$ is a halogen atom, or a C1-20 alkyl, C2-10 alkenyl, C7-40 alkylaryl, C7-40 arylalkyl, C6-20 aryl, substituted or unsubstituted C1-20 alkylidene, substituted or unsubstituted amino, C2-20 alkylalkoxy, or C7-40 arylalkoxy; and n is 1 or 0.

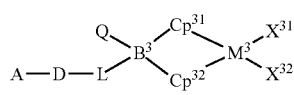

[Chemical Formula 3]

In Chemical Formula 3,

A is hydrogen, a halogen, or a C1-20 alkyl, C2-20 alkenyl, C6-20 aryl, C7-20 alkylaryl, C7-20 arylalkyl, C1-20 alkoxy, C2-20 alkoxyalkyl, C3-20 heterocycloalkyl, or C5-20 heteroaryl group;

D is —O—, —S—, —N(R)—, or —Si(R)(R')—, and R and R' are identical to or different from each other, and are each independently hydrogen, a halogen, or a C1-20 alkyl, C2-20 alkenyl, or C6-20 aryl group;

L is a C1-10 linear or branched alkylene group;

$B^3$ is carbon, silicon, or germanium;

Q is hydrogen, a halogen, or a C1-20 alkyl, C2-20 alkenyl, C6-20 aryl, C7-20 alkylaryl, or C7-20 arylalkyl;

$M^3$ is Group 4 transition metal;

$X^{31}$ and $X^{32}$ are identical to or different from each other, and are each independently a halogen, or a C1-20 alkyl, C2-20 alkenyl, C6-20 aryl, nitro, amido, C1-20 alkylsilyl, C1-20 alkoxy, or C1-20 sulfonate group; and $Cp^{31}$ and $Cp^{32}$ are identical to or different from each other, and are each independently represented by one of the following Chemical Formula 4a, Chemical Formula 4b, or Chemical Formula 4c, provided that both $Cp^{31}$ and $Cp^{32}$ are not represented by Chemical Formula 4c.

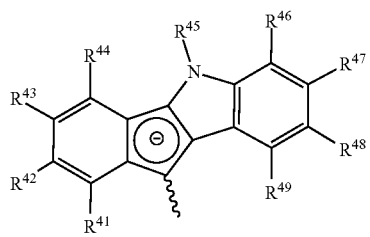

[Chemical Formula 4a]

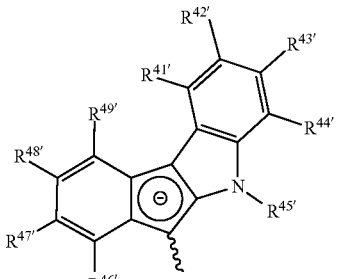

[Chemical Formula 4b]

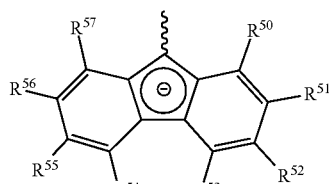

[Chemical Formula 4c]

In Chemical Formula 4a, 4b, and 4c, $R^{41}$ to $R^{57}$ and $R^{41'}$ to $R^{49'}$ are identical to or different from each other, and are each independently hydrogen, a halogen, or a C1-20 alkyl, C2-20 alkenyl, C1-20 alkylsilyl, C1-20 silylalkyl, C1-20 alkoxysilyl, C1-20 alkoxy, C6-20 aryl, C7-20 alkylaryl, or C7-20 arylalkyl; and two or more neighboring groups of $R^{50}$ to $R^{57}$ may be connected to each other to form a substituted or unsubstituted aliphatic or aromatic ring.

In general, an ethylene polymer prepared with a metallocene catalyst system has excellent mechanical properties due to a narrow molecular weight distribution compared to those prepared with Ziegler-Natta catalysts, but has relatively poor processability. Further, if the molecular weight is increased so as to improve the mechanical properties of the ethylene polymer, processability is relatively deteriorated.

However, as the result of continuous studies by the present inventors, it was confirmed that a hybrid catalyst system wherein a compound represented by Chemical Formula 1 is supported together with one or more kinds of compounds selected from the group consisting of compounds represented by Chemical Formula 2 and Chemical Formula 3 (for example, Chemical Formula 2, Chemical Formula 3, or Chemical Formulas 2 and 3) not only exhibits high polymerization activity without fouling during ethylene slurry polymerization, but also enables the preparation of an ethylene polymer having a narrow molecular weight distribution and excellent processability.

That is, a hybrid catalyst system wherein one or more kinds of compounds of Chemical Formula 2 and Chemical Formula 3 and a compound of Chemical Formula 1 are simultaneously supported may exhibit high polymerization activity during an ethylene slurry polymerization process, compared to the cases that do not fulfill such combinations (for example, a catalyst system wherein one of the compounds of Chemical Formulas 1 to 3 is supported alone, etc.).

Furthermore, a hybrid catalyst system wherein one or more kinds of compounds of Chemical Formula 2 and Chemical Formula 3 and a compound of Chemical Formula 1 are simultaneously supported enables the preparation of an ethylene polymer with excellent processability, which cannot be achieved through the cases that do not fulfill such combinations.

Particularly, an ethylene polymer prepared with the supported hybrid catalyst system, although it has a narrow molecular weight distribution, exhibits excellent processability. As such, the supported hybrid catalyst system enables the provision of an ethylene polymer simultaneously securing mechanical properties and processability, which are generally in a trade-off relationship.

The supported hybrid catalyst system according to the embodiment of the present invention includes a carrier and two or more kinds of metallocene compounds supported on the carrier.

The carrier may contain hydroxyl groups on the surface, and preferably, it may be dried to remove moisture on the surface and have highly reactive hydroxyl groups and siloxane groups. As non-limiting examples, the carrier may be silica, silica-alumina, or silica-magnesia, etc., dried at high temperature. Further, the carrier may contain an oxide such as $Na_2O$, a carbonate such as $K_2CO_3$, a sulfate such as $BaSO_4$, or a nitrate such as $Mg(NO_3)_2$.

Meanwhile, the metallocene compound includes a compound represented by Chemical Formula 1, and one or more kinds of compounds selected from the group consisting of compounds represented by Chemical Formula 2 and Chemical Formula 3.

Specifically, the supported hybrid catalyst system according to the embodiment of the present invention may include, as the metallocene compound, i) a compound of Chemical Formula 1 and a compound of Chemical Formula 2; ii) a compound of Chemical Formula 1 and a compound of Chemical Formula 3; or iii) a compound of Chemical Formula 1, a compound of Chemical Formula 2, and a compound of Chemical Formula 3.

In Chemical Formulas 1 to 3, the C1-20 alkyl group includes a linear or branched alkyl group. Specifically, the alkyl group may include a methyl, ethyl, propyl, isopropyl, n-butyl, tert-butyl, pentyl, hexyl, heptyl, or octyl group, etc.

The Group 4 transition metal may include titanium (Ti), zirconium (Zr), hafnium (Hf), etc., and preferably, it may be zirconium.

The C2-20 alkenyl group includes a linear or branched alkenyl group. Specifically, the alkenyl group may include an allyl, ethenyl, propenyl, butenyl, or pentenyl group, etc.

The C6-20 aryl group includes a monocyclic or condensed-cyclic aryl group. Specifically, the aryl group may include a phenyl, biphenyl, naphthyl, phenanthrenyl, or fluorenyl group, etc.

The C5-20 heteroaryl group includes a monocyclic or condensed-cyclic heteroaryl group. Specifically, the heteroaryl group may include a carbazoylyl, pyridyl, quinolinyl, isoquinolinyl, thiophenyl, furanyl, imidazolyl, oxazolyl, thiazolyl, triazinyl, tetrahydropyranyl, or tetrahydrofuranyl group, etc.

The C1-20 alkoxy group may include a methoxy, ethoxy, phenyloxy, cyclohexyloxy, or tert-butoxyhexyl group, etc.

The C1-20 alkylsilyl group may include a methylsilyl, dimethylsilyl, or trimethylsilyl group, etc.

The C1-20 silylalkyl group may include silylmethyl, dimethylsilylmethyl ($-CH_2-Si(CH_3)_2H$), trimethylsilylmethyl($-CH_2-Si(CH_3)_3$), etc.

According to the embodiment of the present invention, the compound represented by Chemical Formula 1 may be selected from the group consisting of compounds represented by the following structural formulas:

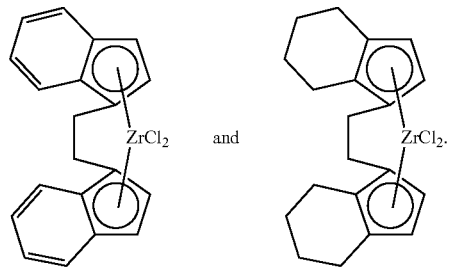

According to the embodiment of the present invention, the compound represented by Chemical Formula 2 may be selected from the group consisting of compounds represented by the following structural formulas.

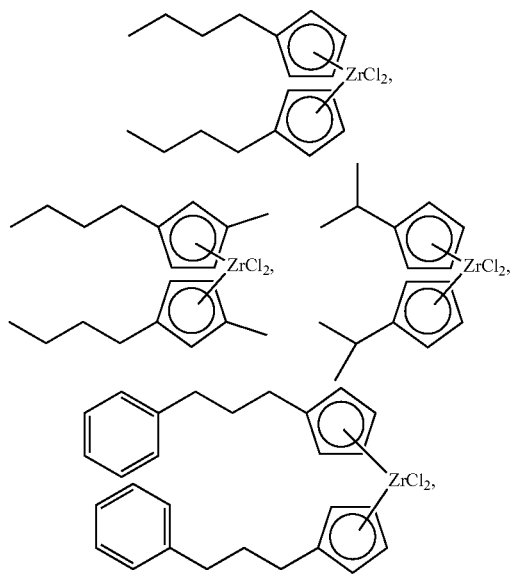

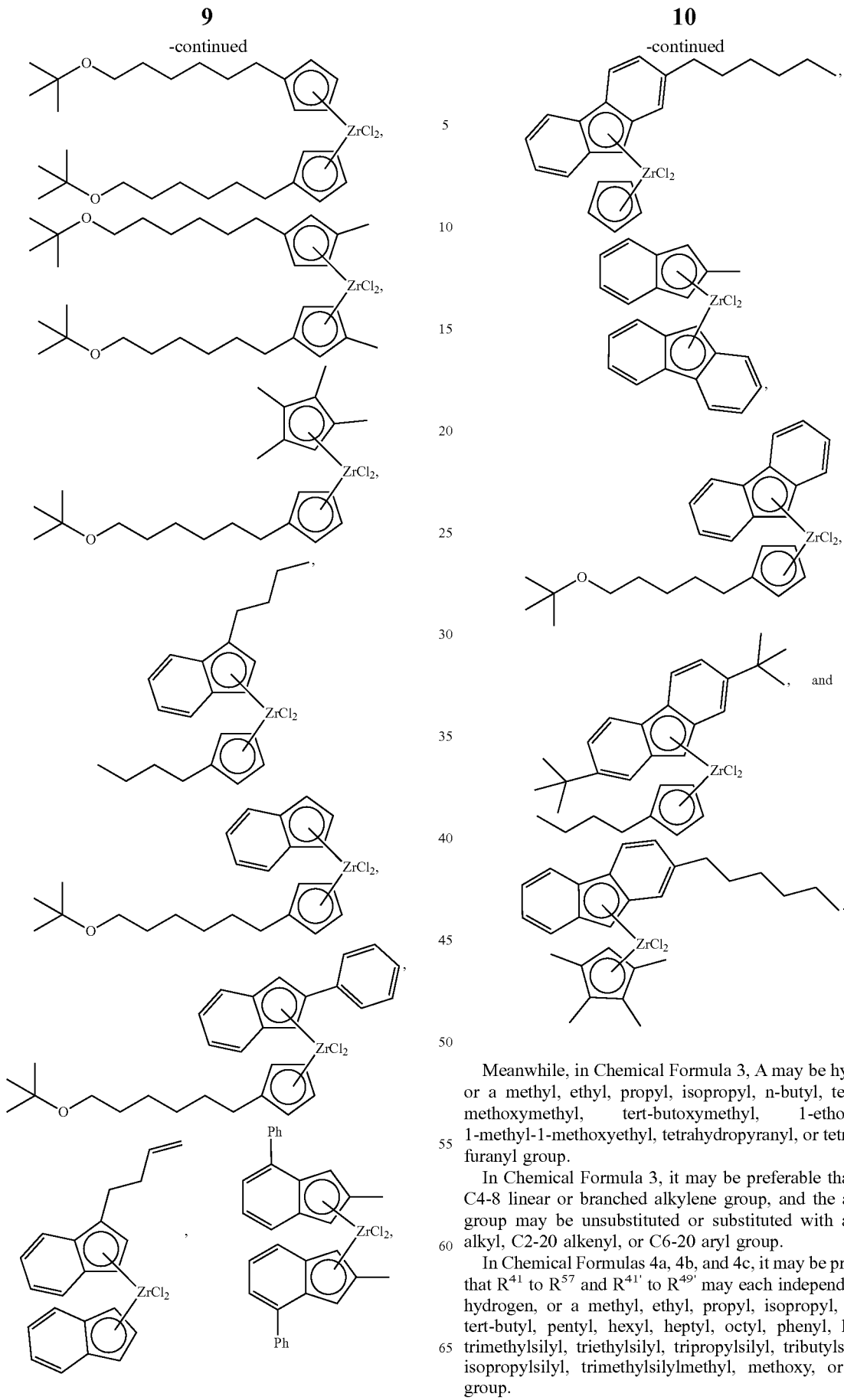

Meanwhile, in Chemical Formula 3, A may be hydrogen, or a methyl, ethyl, propyl, isopropyl, n-butyl, tert-butyl, methoxymethyl, tert-butoxymethyl, 1-ethoxyethyl, 1-methyl-1-methoxyethyl, tetrahydropyranyl, or tetrahydrofuranyl group.

In Chemical Formula 3, it may be preferable that L is a C4-8 linear or branched alkylene group, and the alkylene group may be unsubstituted or substituted with a C1-20 alkyl, C2-20 alkenyl, or C6-20 aryl group.

In Chemical Formulas 4a, 4b, and 4c, it may be preferable that $R^{41}$ to $R^{57}$ and $R^{41'}$ to $R^{49'}$ may each independently be hydrogen, or a methyl, ethyl, propyl, isopropyl, n-butyl, tert-butyl, pentyl, hexyl, heptyl, octyl, phenyl, halogen, trimethylsilyl, triethylsilyl, tripropylsilyl, tributylsilyl, triisopropylsilyl, trimethylsilylmethyl, methoxy, or ethoxy group.

The compound of Chemical Formula 3 may form a structure wherein an indeno indole derivative and/or a fluorene derivative are crosslinked by a bridge, and has unshared electron pairs capable of acting as a Lewis base in the ligand structure. Thus, the compound of Chemical Formula 3 may be supported on a surface having a Lewis acid property to exhibit high polymerization activity.

Further, it has high activity because it includes an electron-rich indeno indole derivative and/or fluorene derivative, and due to appropriate steric hindrance and electronic effect of the ligand, it has low hydrogen reactivity and maintains high activity even when hydrogen exists. In addition, the nitrogen atom of the indeno indole derivative stabilizes beta-hydrogen of a growing polymer chain to inhibit beta-hydrogen elimination, thus polymerizing an ultra-high molecular weight olefin polymer.

According to the embodiment of the present invention, the group of Chemical Formula 4a may be represented by one of the following structural formulas.

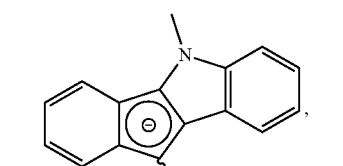,

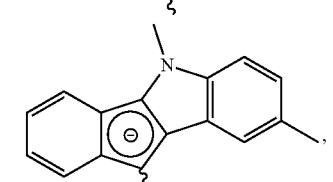,

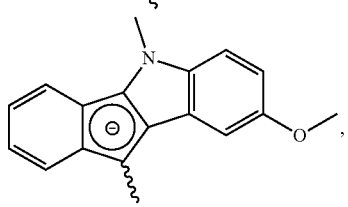,

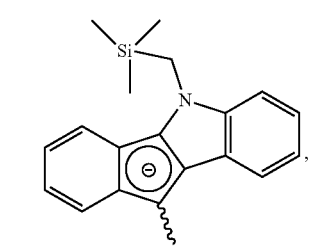,

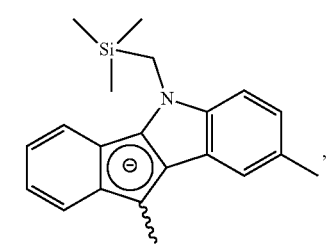,

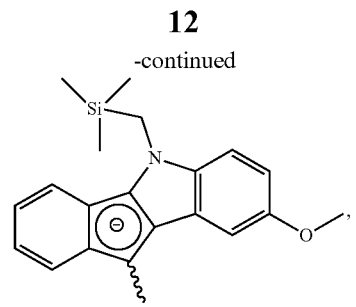,

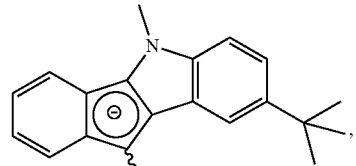,

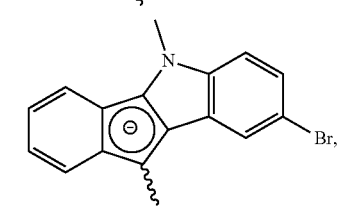,

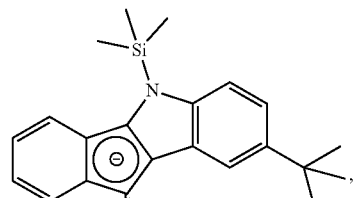,

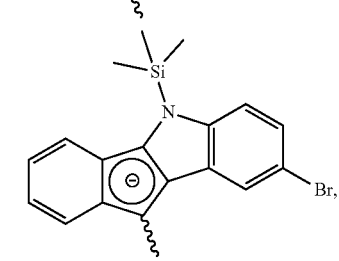,

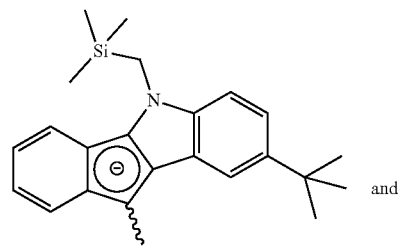 and

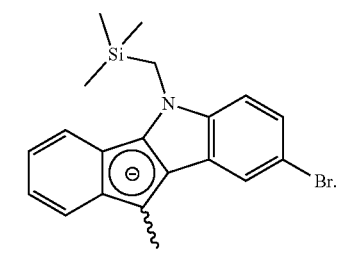.

The group of Chemical Formula 4b may be represented by one of the following structural formulas.

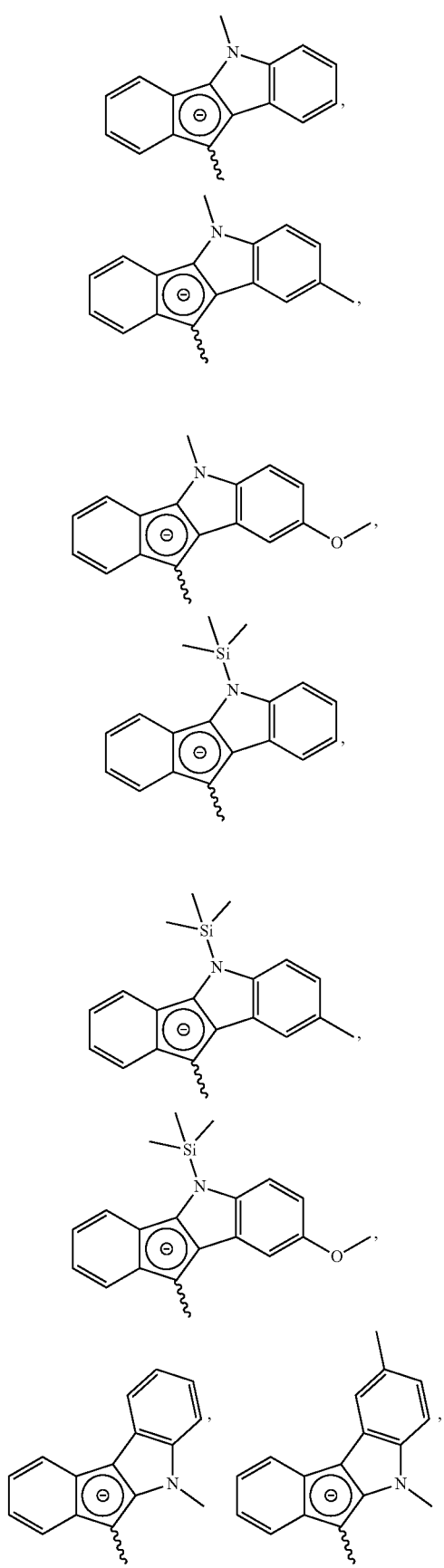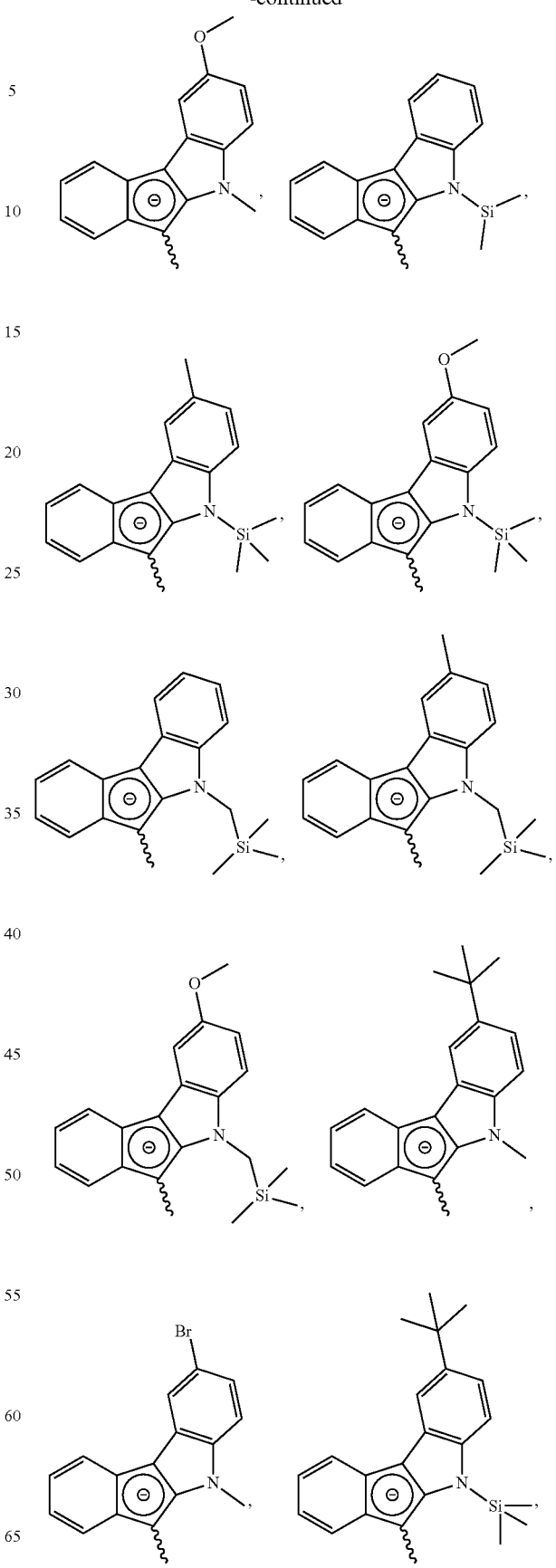

-continued
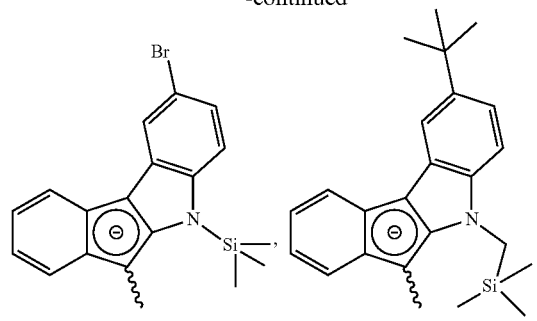
and
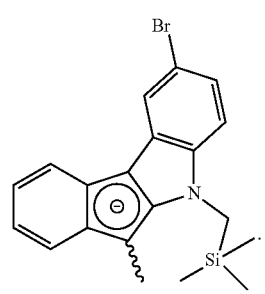
The group of Chemical Formula 4c may be represented by one of the following structural formulas.
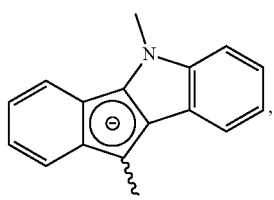
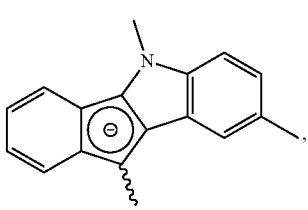
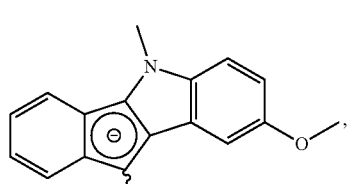
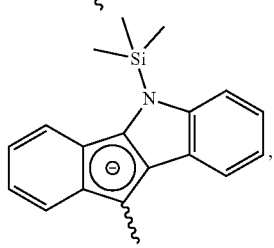
-continued
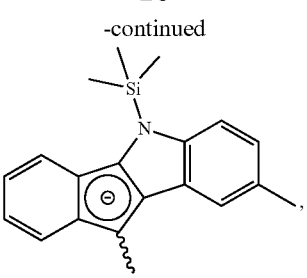
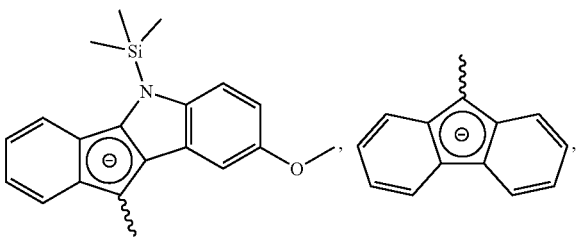
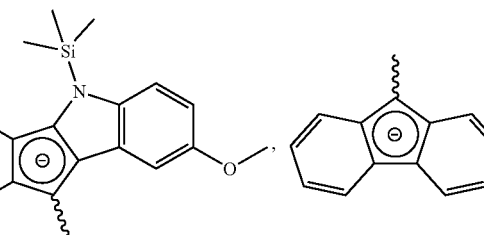
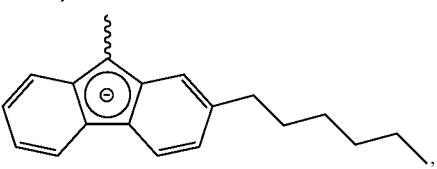
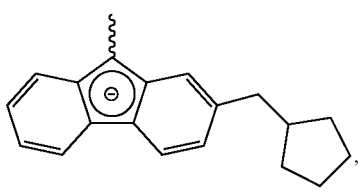
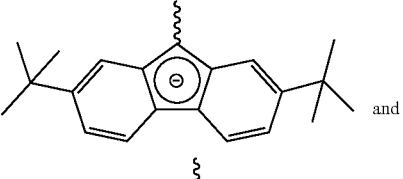
and
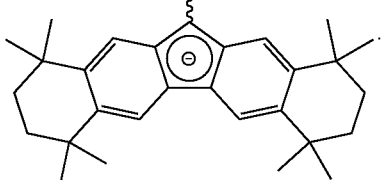
According to the embodiment of the present invention, the compound represented by Chemical Formula 3 may be selected from the group consisting of compounds represented by the following structural formulas.
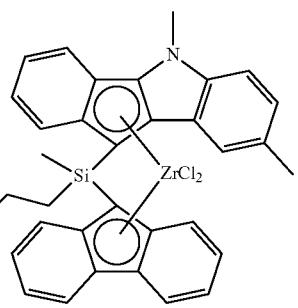

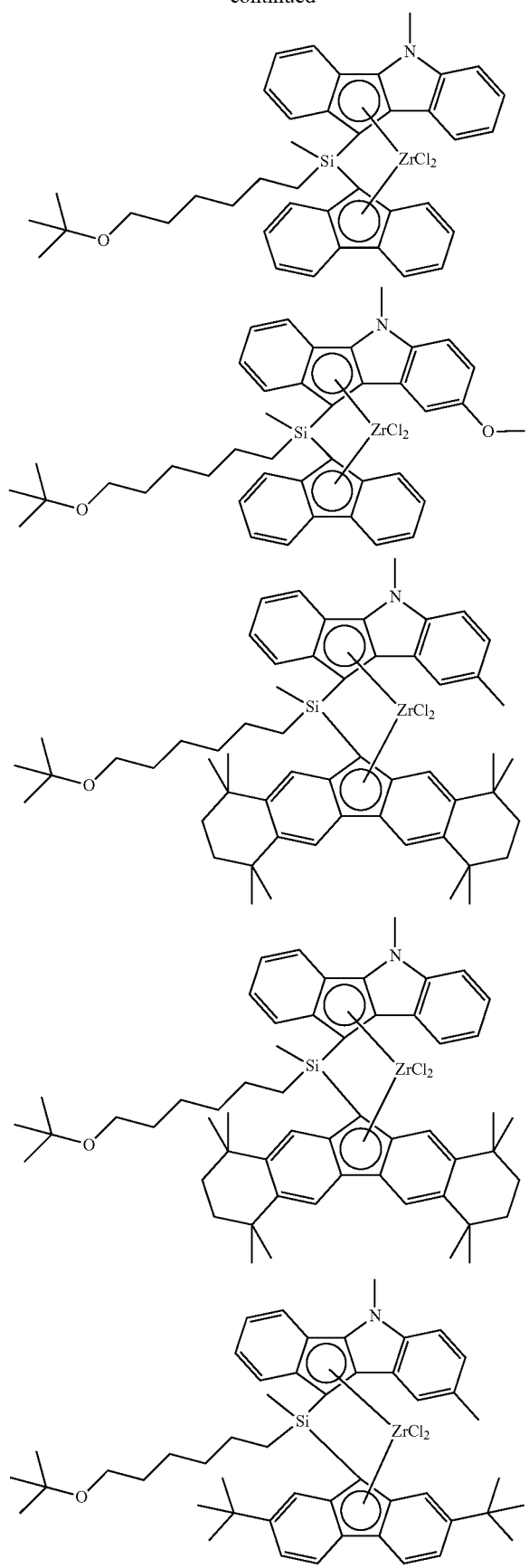
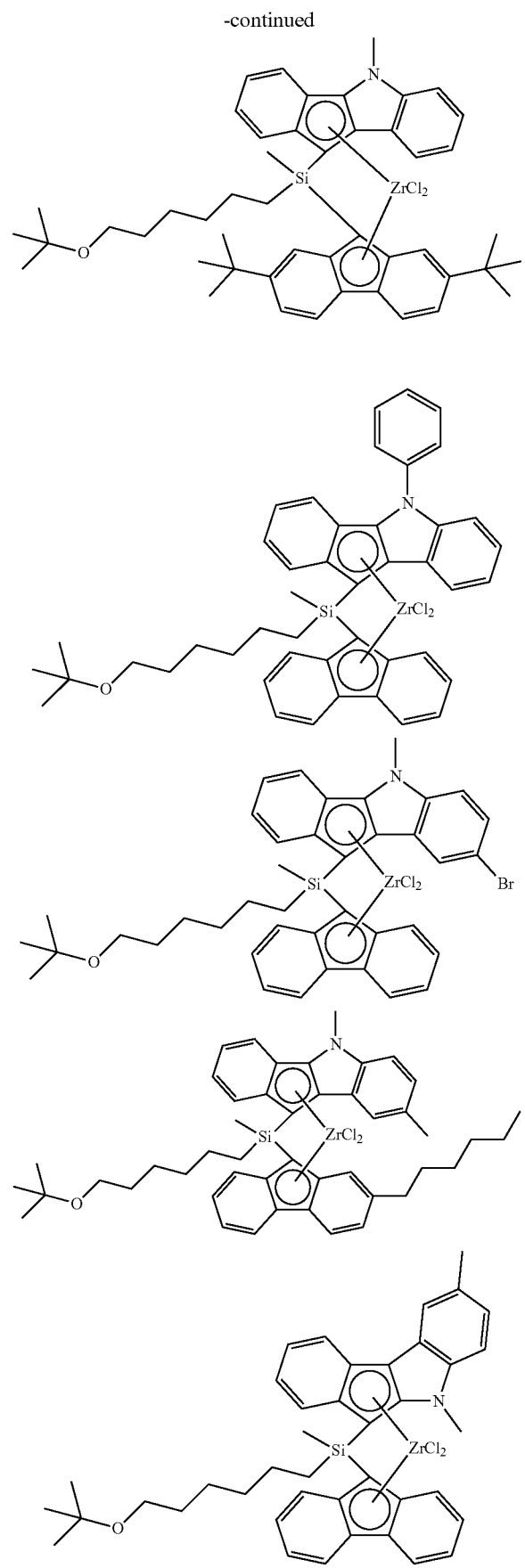

-continued

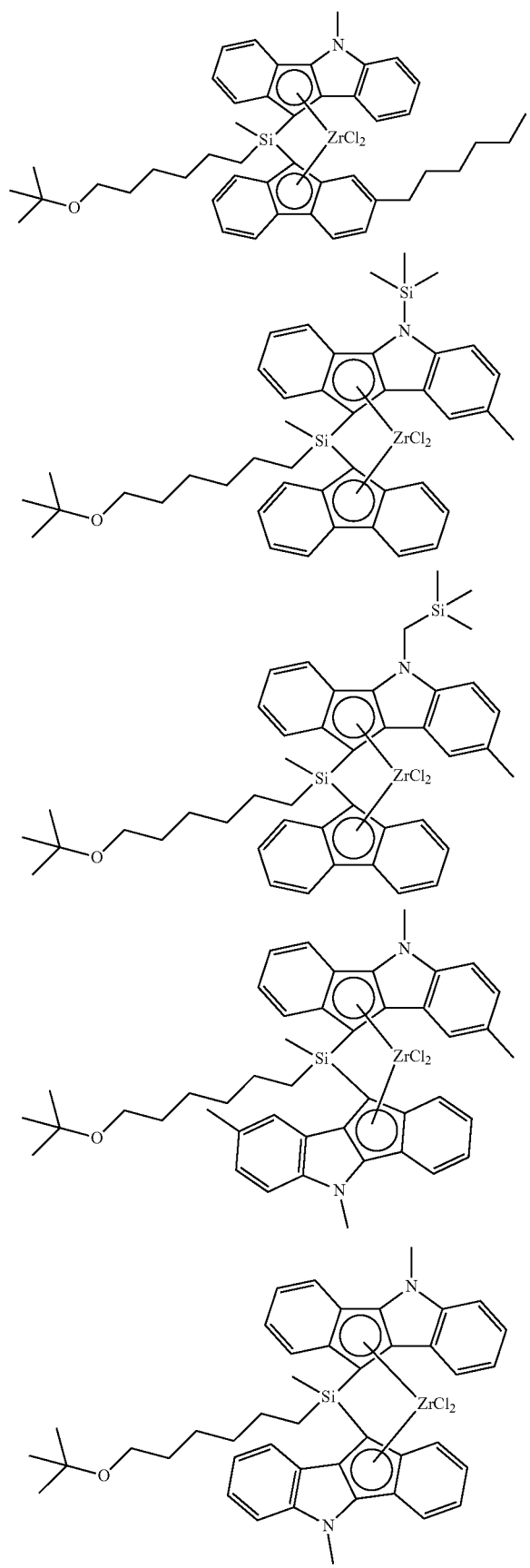

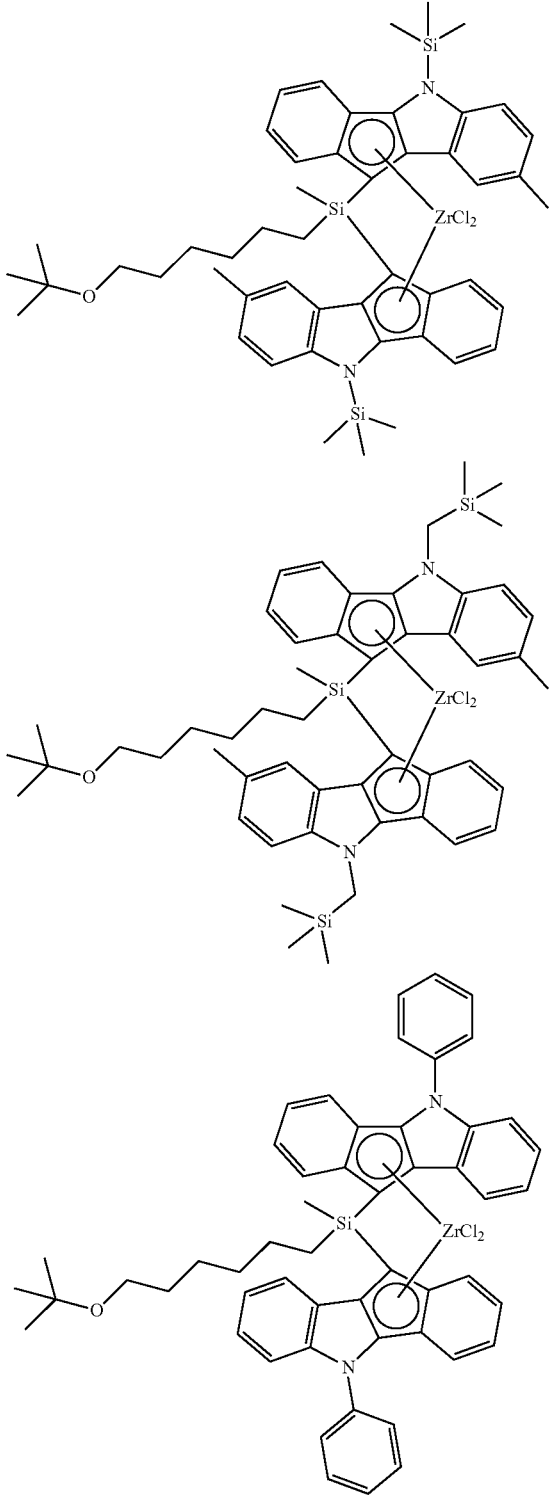

The compound represented by Chemical Formula 3 may be obtained by connecting an indeno indole derivative and/or a fluorene derivative with a bridge compound to prepare a ligand compound, and then introducing a metal precursor compound to conduct metallation.

Further, according to the embodiment of the present invention, a compound of Chemical Formula 1 and one or more kinds of compounds of Chemical Formulas 2 and 3 may be supported on a carrier at a mole ratio of 1:99 to 99:1, and preferably 5:95 to 5:95 (based on the mole number of the transition metal). It is advantageous in terms of achieving the above-explained effects for the metallocene compound to be supported at the above ratio.

Meanwhile, according to the embodiment of the present invention, the supported hybrid catalyst system may further include one or more cocatalysts selected from the group consisting of compounds represented by the following Chemical Formulas 7 to 9.

$$—[Al(R^{71})—O]_c—$$ [Chemical Formula 7]

In Chemical Formula 7,
c is an integer of 2 or more, and
each $R^{71}$ is independently a halogen, or a C1-20 hydrocarbyl or C1-20 hydrocarbyl substituted with a halogen.

$$D(R^{81})_3$$ [Chemical Formula 8]

In Chemical Formula 8,
D is aluminum or boron, and
each $R^{81}$ is independently a halogen, or a C1-20 hydrocarbyl or C1-20 hydrocarbyl substituted with a halogen.

$$[L-H]^+[Q(E)_4]^-$$ [Chemical Formula 9]

in Chemical Formula 9,
L is a neutral Lewis base,
$[L-H]^+$ is a Bronsted acid,
Q is boron or aluminum in the oxidation state of +3e,
each E is independently a halogen having a hydrogen valence of one or more, or a C6-20 aryl or C1-20 alkyl unsubstituted or substituted with a C1-20 hydrocarbyl, alkoxy, or phenoxy functional group.

Specifically, the compound represented by Chemical Formula 7 may be an alkylaluminoxane such as methylaluminoxane, ethylaluminoxane, butylaluminoxane, isobutylaluminoxane, etc. In addition, as the compound of Chemical Formula 7, modified methylaluminoxane (MMAO) wherein a part of the methyl group of the methylaluminoxane is substituted with another alkyl group, may be used. For example, the modified methylaluminoxane may be a compound wherein 40 mol % or less, or 5 mol % to 35 mol % of the methyl groups of the methylaluminoxane is substituted with a C3-10 linear or branched alkyl. Examples of commercially available modified methylaluminoxane may include MMAO-12, MMAO-3A, MMAO-7, etc.

The compound represented by Chemical Formula 8 may include trimethylaluminum, triethylaluminum, triisobutylaluminum, tripropylaluminum, tributylaluminum, dimethylchloroaluminum, dimethylisobutylaluminum, dimethylethylaluminum, diethylchloroaluminum, triisopropylaluminum, triisobutylaluminum, tri-s-butylaluminum, tricyclopentylaluminum, tripentylaluminum, triisopentylaluminum, trihexylaluminum, ethyldimethylaluminum, methyldiethylaluminum, triphenylaluminum, tri-p-tolylaluminum, dimethylaluminum methoxide, dimethylaluminum ethoxide, trimethylboron, triethylboron, triisobutylboron, tripropylboron, tributylboron, etc.

The compound represented by Chemical Formula 9 may include triethylammonium tetra(phenyl)boron, tributylammonium tetra(phenyl)boron, trimethylammonium tetra(phenyl)boron, tripropylammonium tetra(phenyl)boron, trimethylammonium tetra(p-tolyl) boron, triethylammonium tetra(o,p-dimethylphenyl)boron, trimethylammonium tetra(o,p-dimethylphenyl)boron, tributylammonium tetra(p-trifluoromethylphenyl)boron, trimethylammonium tetra(p-trifluoromethylphenyl)boron, tributylammonium tetra(pentafluorophenyl)boron, N,N-diethylanilinium tetra(phenyl)boron, N,N-diethylanilinium tetra(phenyl)boron, N,N-diethylanilinium tetra(pentafluorophenyl)boron, diethylammonium tetra(pentafluorophenyl)boron, triphenylphosphonium tetra(phenyl)boron, trimethylphosphonium tetra(phenyl)boron, triethylammonium tetra(phenyl)aluminum, tributylammonium tetra(phenyl)aluminum, trimethylammonium tetra(phenyl)aluminum, tripropylammonium tetra(phenyl)aluminum, trimethylammonium tetra(p-tolyl)aluminum, tripropylammonium tetra(p-tolyl)aluminum, triethylammonium tetra(o,p-dimethylphenyl)aluminum, tributylammonium tetra(p-trifluoromethylphenyl)aluminum, trimethylammonium tetra(p-trifluoromethylphenyl) aluminum, tributylammonium tetra(pentafluorophenyl)aluminum, N,N-diethylanilinium tetra(phenyl)aluminum, N,N-diethylanilinium tetra(phenyl)aluminum, N,N-diethylanilinium tetra(pentafluorophenyl)aluminum, diethylammonium tetra(pentafluorophenyl)aluminum, triphenylphosphonium tetra(phenyl)aluminum, trimethylphosphonium tetra(phenyl)aluminum, triphenylcarbonium tetra(phenyl)boron, triphenylcarbonium tetra(phenyl)aluminum, triphenylcarbonium tetra(p-trifluoromethylphenyl)boron, triphenylcarbonium tetra(pentafluorophenyl)boron, etc.

Preferably, as the cocatalyst, one or more compounds selected from the group consisting of trimethyl aluminum, triethyl aluminum, triisopropyl aluminum, triisobutyl aluminum, ethylaluminum sesquichloride, diethylaluminum chloride, ethyl aluminum dichloride, methylaluminoxane, and modified methylaluminoxane may be used.

The content of the cocatalyst may be determined considering catalytic activity, etc. According to the embodiment of the present invention, the cocatalyst may be included at a mole ratio of 1:1 to 1:10000, 1:1 to 1:5000, or 1:1 to 1:3000, based on the metallocene compound.

Meanwhile, the supported hybrid catalyst system may be prepared by supporting a cocatalyst on a carrier; supporting a compound represented by Chemical Formula 1 on the carrier; and supporting one or more kinds of compounds selected from the group consisting of compounds represented by Chemical Formula 2 and Chemical Formula 3. However, the sequence of supporting the metallocene compounds may be changed as necessary.

In the preparation of the supported hybrid catalyst system, hydrocarbon solvents such as pentane, hexane, and heptane, or aromatic solvents such as benzene and toluene, may be used.

II. Method for Preparing Ethylene Polymer

Meanwhile, according to another embodiment of the present invention, a method for preparing an ethylene polymer including the step of slurry polymerization of olefin monomers including ethylene in the presence of the above-explained supported hybrid catalyst system is provided.

Particularly, the above-explained supported hybrid catalyst system may exhibit high polymerization activity without fouling in the slurry polymerization of ethylene, and enables the preparation of an ethylene polymer having a narrow molecular weight distribution but excellent processability.

The method for preparing the ethylene polymer may be conducted by slurry polymerization using common equipment and contact technology, with olefin monomers including ethylene as raw materials, in the presence of the above-explained supported hybrid catalyst system.

As non-limiting examples, the method for preparing an ethylene polymer may be conducted by homopolymerization of ethylene or copolymerization of ethylene and comonomers, using a continuous type of slurry polymerization reactor, a loop slurry reactor, etc.

As the comonomer, propylene, 1-butene, 1-pentene, 4-methyl-1-pentene, 1-hexene, 1-heptene, 1-octene, 1-decene, 1-undecene, 1-dodecne, 1-tetradecene, 1-hexadecene, 1-eicosene, etc. may be used.

In the preparation method, the supported hybrid catalyst system may be used while being dissolved or diluted in a solvent such as pentane, hexane, heptane, nonane, decane, toluene, benzene, dichloromethane, chlorobenzene, etc.

The method for preparing and ethylene polymer may be conducted at a temperature of 20 to 500° C. or 20 to 200° C., and a pressure of 1 to 100 kgf/cm² or 1 to 70 kgf/cm², for 1 to 24 hours or 1 to 10 hours.

As necessary, the polymerization may be conducted in the presence or absence of hydrogen.

Since the method for preparing an ethylene polymer according to the embodiment of the invention is conducted by slurry polymerization in the presence of the above-explained supported hybrid catalyst system, it enables the provision of an ethylene polymer that has a narrow molecular weight distribution and thus has excellent mechanical properties, and yet, has excellent processability.

Specifically, the method for preparing an ethylene polymer may provide an ethylene polymer having a weight average molecular weight (Mw) of 50,000 g/mol or more, 50,000 to 150,000 g/mol, 60,000 to 100,000 g/mol, or 70,000 to 90,000 g/mol.

The method for preparing an ethylene polymer may provide an ethylene polymer having a polydispersity index (PDI) of 3.5 or less, 2.0 to 3.5, or 2.5 to 3.5.

The method for preparing an ethylene polymer may provide an ethylene polymer having a melt index (190° C., 2.16 kg) of 7.0 to 8.5 g/10 min, or 7.5 to 8.0 g/10 min, measured according to ASTM D 1238.

The method for preparing an ethylene polymer may provide an ethylene polymer wherein a ratio (MI10/MI2.16, MFRR) of the first melt index (190° C., 2.16 kg, MI 2.6) and the second melt index (190° C., 10 kg, MI10) is 2.5 to 4.0, 3.0 to 4.0, or 3.3 to 3.5.

The method for preparing an ethylene polymer may provide an ethylene polymer having a spiral flow of 20 to 35 cm, 20 to 30 cm, 20 to 25 cm, or 23 to 25 cm, measured according to ASTM D 3123-09.

Advantageous Effects

The supported hybrid catalyst system according to the present invention enables the preparation of an ethylene polymer that exhibits high activity during ethylene slurry polymerization, and not only has a narrow molecular weight distribution, but also has excellent processability.

DETAILED DESCRIPTION OF THE EMBODIMENTS

Hereinafter, preferable examples will be presented for better understanding of the present invention. However, these examples are presented only as illustrations of the invention, and the present invention is not limited thereby.

Preparation Example 1

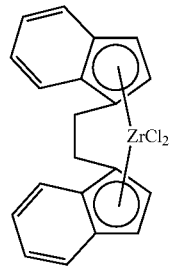

A metallocene compound of the above structural formula, dichloro[rac-ethylene bis(indenyl)]zirconium(IV), was prepared (purchased from Sigma-Aldrich, CAS Number 100080-82-8).

Preparation Example 2

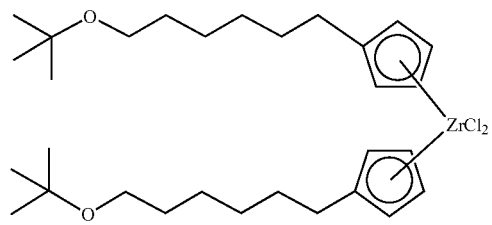

t-butyl-O—$(CH_2)_6$—Cl was prepared using 6-chlorohexanol by a method described in the document Tetrahedron Lett. 2951 (1988), and NaCp was reacted therewith to obtain t-butyl-O—$(CH_2)_6$—$C_6H_6$ (yield 60%, b.p. 80° C./0.1 mmHg).

Further, at −78° C., t-butyl-O—$(CH_2)_6$—$C_6H_6$ was dissolved in THF, and n-BuLi was slowly added thereto, followed by a temperature rise to room temperature and reaction for 8 hours. The synthesized lithium salt solution was slowly added to a suspension of $ZrCl_4(THF)_2$ (1.70 g, 4.50 mmol)/THF (30 ml) at −78° C., and the solution was additionally reacted at room temperature for 6 hours.

All the volatile materials were vacuum dried, and a hexane solvent was added to the obtained oily liquid to filter it. The filtered solution was vacuum dried, and then hexane was added to induce precipitation at a low temperature (−20° C.). The obtained precipitate was filtered at a low temperature to obtain a compound [tBu-O—$(CH_2)_6$—$C_6H_4]_2ZrCl_2$ in the form of a white solid (yield 92%).

$^1$H NMR (300 MHz, $CDCl_3$): 6.28 (t, J=2.6 Hz, 2H), 6.19 (t, J=2.6 Hz, 2H), 3.21 (t, 6.6 Hz, 2H), 2.62 (t, J=8 Hz), 1.7-1.3 (m, 8H), 1.17 (s, 9H).

$^{13}$C NMR ($CDCl_3$): 135.09, 116.66, 112.28, 72.42, 61.52, 30.66, 30.61, 30.14, 29.18, 27.58, 26.00.

Precipitation Example 3

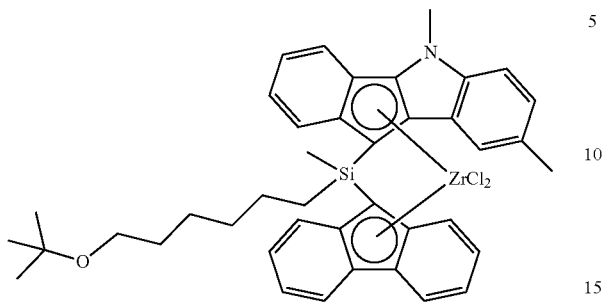

(Preparation of a Ligand Compound)

2 g of fluorene was dissolved in 5 mL MTBE and 100 mL of hexane, 5.5 mL of a 2.5M n-BuLi solution in hexane was added dropwise in a dry ice/acetone bath, and the solution was stirred at room temperature overnight. 3.6 g of (6-(tert-butoxy)hexyl)dichloro(methyl)silane was dissolved in 50 mL of hexane, the fluorene-Li slurry was transferred thereto under a dry ice/acetone bath for 30 minutes, and the solution was stirred at room temperature overnight.

Simultaneously, 5,8-dimethyl-5,10-dihydroindeno[1,2-b]indole (12 mmol, 2.8 g) was also dissolved in 60 mL of THF, 5.5 mL of a 2.5M n-BuLi solution in hexane was added dropwise in a dry ice/acetone bath, and the solution was stirred at room temperature overnight. By NMR sampling of the reaction solution of fluorene and (6-(tert-butoxy)hexyl)dichloro(methyl)silane, the completion of the reaction was confirmed, and then the dimethyl-5,10-dihydroindeno[1,2-b]indole-Li solution was transferred thereto under a dry ice/acetone bath. The solution was stirred at room temperature overnight.

After the reaction, the solution was extracted with ether/water, and the remaining moisture in the organic layer was removed with $MgSO_4$, thus obtaining a ligand compound (Mw 597.90, 12 mmol). Two isomers were observed in $^1$H-NMR.

$^1$H NMR (500 MHz, d6-benzene): −0.30~−0.18 (3H, d), 0.40 (2H, m), 0.65~1.45 (8H, m), 1.12 (9H, d), 2.36~2.40 (3H, d), 3.17 (2H, m), 3.41~3.43 (3H, d), 4.17~4.21 (1H, d), 4.34~4.38 (1H, d), 6.90~7.80 (15H, m).

(Preparation of a Metallocene Compound)

7.2 g (12 mmol) of the above-prepared ligand compound was dissolved in 50 mL of diethylether, 11.5 mL of a 2.5 M n-BuLi solution in hexane was added dropwise in a dry ice/acetone bath, and the solution was stirred at room temperature overnight. The solution was vacuum dried to obtain a sticky oil of a brown color. It was dissolved in toluene to obtain a slurry.

$ZrCl_4(THF)_2$ was prepared, and 50 mL of toluene was added to prepare a slurry. The 50 mL toluene slurry of $ZrCl_4(THF)_2$ was transferred in a dry ice/acetone bath. As the solution was stirred at room temperature overnight, it was turned into a violet color. The reaction solution was filtered to remove LiCl. Toluene in the filtrate was removed by vacuum drying, and then hexane was added, and the solution was sonicated for 1 hour.

The slurry was filtered to obtain 6 g of filtered solid, a dark violet metallocene compound (Mw 758.02, 7.92 mmol, yield 66 mol %). Two isomers were observed in $^1$H-NMR.

$^1$H NMR (500 MHz, $CDCl_3$): 1.19 (9H, d), 1.71 (3H, d), 1.50~1.70 (4H, m), 1.79 (2H, m), 1.98~2.19 (4H, m), 2.58 (3H, s), 3.38 (2H, m), 3.91 (3H, d), 6.66~7.88 (15H, m).

Preparation Example 4

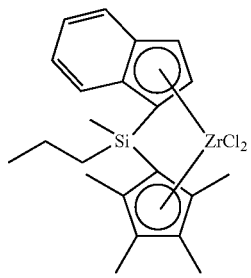

A metallocene compound of the above chemical formula was prepared.

Example 1

Silica (manufactured by Grace Davison, SYLOPOL 948) was dehydrated at 400° C. for 15 hours under vacuum.

10 g of dried silica was put in a glass reactor, 100 mL of toluene was additionally put therein, and the solution was stirred. 50 mL of a 10 wt % methylaluminoxane (MAO)/toluene solution was added thereto, and the solution was slowly reacted at 40° C. while stirring. Thereafter, it was washed with a sufficient amount of toluene to remove an unreacted aluminum compound, and the remaining toluene was removed by pressure reduction.

Again, 100 mL of toluene was introduced, and then 0.25 mmol of the metallocene compound prepared in Preparation Example 1 was dissolved in toluene and introduced together, and the solution was reacted for 1 hour. After the reaction was finished, 0.25 mmol of the metallocene compound prepared in Preparation Example 2 was dissolved in toluene and introduced, and the solution was additionally reacted for 1 hour.

After the reaction was finished, stirring was stopped, and the toluene layer was separated and removed, 1.0 mmol of anilinium borate (N, N-dimethylanilinium tetrakis(pentafluorophenyl)borate, AB) was introduced, the solution was stirred for 1 hour, and toluene was removed by pressure reduction at 50° C., thus preparing a supported catalyst.

Example 2

Silica (manufactured by Grace Davison, SYLOPOL 948) was dehydrated at 400° C. for 15 hours under vacuum.

10 g of dried silica was put in a glass reactor, 100 mL of toluene was additionally put therein, and the solution was stirred. 50 mL of a 10 wt % methylaluminoxane (MAO)/toluene solution was added thereto, and the solution was slowly reacted at 40° C. while stirring. Thereafter, it was washed with a sufficient amount of toluene to remove an unreacted aluminum compound, and the remaining toluene was removed by pressure reduction.

Again, 100 mL of toluene was introduced, and then 0.25 mmol of the metallocene compound prepared in Preparation Example 1 was dissolved in toluene and introduced together, and the solution was reacted for 1 hour. After the reaction was finished, 0.125 mmol of the metallocene compound prepared in Preparation Example 2 was dissolved in toluene and introduced, and then the solution was additionally reacted for 1 hour. After the reaction was finished, 0.125 mmol of the metallocene compound prepared in Preparation Example 3 was dissolved in toluene and introduced, and the solution was additionally reacted for 1 hour.

After the reaction was finished, stirring was stopped and the toluene layer was separated and removed, 1.0 mmol of anilinium borate (N, N-dimethylanilinium tetrakis(pentafluorophenyl)borate, AB) was introduced and the solution was stirred for 1 hour, and toluene was removed by pressure reduction at 50° C., thus preparing a supported catalyst.

Example 3

Silica (manufactured by Grace Davison, SYLOPOL 948) was dehydrated at 400° C. for 15 hours under vacuum.

10 g of dried silica was put in a glass reactor, 100 mL of toluene was additionally put therein, and the solution was stirred. 50 mL of a 10 wt % methylaluminoxane (MAO)/toluene solution was added thereto, and the solution was slowly reacted at 40° C. while stirring. Thereafter, it was washed with a sufficient amount of toluene to remove an unreacted aluminum compound, and the remaining toluene was removed by pressure reduction.

Again, 100 mL of toluene was introduced, and then, 0.25 mmol of the metallocene compound prepared in Preparation Example 1 was dissolved in toluene and introduced together, and the solution was reacted for 1 hour. After the reaction was finished, 0.25 mmol of the metallocene compound prepared in Preparation Example 3 was dissolved in toluene and introduced, and the solution was additionally reacted for 1 hour.

After the reaction was finished, stirring was stopped and the toluene layer was separated and removed, 1.0 mmol of anilinium borate (N, N-dimethylanilinium tetrakis(pentafluorophenyl)borate, AB) was introduced and the solution was stirred for 1 hour, and toluene was removed by pressure reduction at 50° C., thus preparing a supported catalyst.

Comparative Example 1

Silica (manufactured by Grace Davison, SYLOPOL 948) was dehydrated at 400° C. for 15 hours under vacuum.

10 g of dried silica was put in a glass reactor, 100 mL of toluene was additionally put therein, and the solution was stirred. 50 mL of a 10 wt % methylaluminoxane (MAO)/toluene solution was added thereto, and the solution was slowly reacted at 40° C. while stirring. Thereafter, it was washed with a sufficient amount of toluene to remove an unreacted aluminum compound, and the remaining toluene was removed by pressure reduction.

Again, 100 mL of toluene was introduced, 0.25 mmol of the metallocene compound prepared in Preparation Example 4 was dissolved in toluene and introduced together, and the solution was reacted for 1 hour. After the reaction was finished, 0.25 mmol of the metallocene compound prepared in Preparation Example 2 was dissolved in toluene and introduced, and then the solution was additionally reacted for 1 hour.

After the reaction was finished, stirring was stopped and the toluene layer was separated and removed, 1.0 mmol of anilinium borate (N, N-dimethylanilinium tetrakis(pentafluorophenyl)borate, AB) was introduced and the solution was stirred for 1 hour, and toluene was removed by pressure reduction at 50° C., thus preparing a supported catalyst.

Comparative Example 2

Silica (manufactured by Grace Davison, SYLOPOL 948) was dehydrated at 400° C. for 15 hours under vacuum.

10 g of dried silica was put in a glass reactor, 100 mL of toluene was additionally put therein, and the solution was stirred. 50 mL of a 10 wt % methylaluminoxane (MAO)/toluene solution was added thereto, and the solution was slowly reacted at 40° C. while stirring. Thereafter, it was washed with a sufficient amount of toluene to remove an unreacted aluminum compound, and the remaining toluene was removed by pressure reduction.

Again, 100 mL of toluene was introduced, 0.25 mmol of the metallocene compound prepared in Preparation Example 4 was dissolved in toluene and introduced together, and the solution was reacted for 1 hour. After the reaction was finished, 0.125 mmol of the metallocene compound prepared in Preparation Example 2 was dissolved in toluene and introduced, and the solution was additionally reacted for 1 hour. After the reaction was finished, 0.125 mmol of the metallocene compound prepared in Preparation Example 3 was dissolved in toluene and introduced, and then the solution was additionally reacted for 1 hour.

After the reaction was finished, stirring was stopped and the toluene layer was separated and removed, 1.0 mmol of anilinium borate (N, N-dimethylanilinium tetrakis(pentafluorophenyl)borate, AB) was introduced and the solution was stirred for 1 hour, and toluene was removed by pressure reduction at 50° C., thus preparing a supported catalyst.

Comparative Example 3

Silica (manufactured by Grace Davison, SYLOPOL 948) was dehydrated at 400° C. for 15 hours under vacuum.

10 g of dried silica was put in a glass reactor, 100 mL of toluene was additionally put therein, and the solution was stirred. 50 mL of a 10 wt % methylaluminoxane (MAO)/toluene solution was added thereto, and the solution was slowly reacted at 40° C. while stirring. Thereafter, it was washed with a sufficient amount of toluene to remove an unreacted aluminum compound, and the remaining toluene was removed by pressure reduction.

Again, 100 mL of toluene was introduced, 0.25 mmol of the metallocene compound prepared in Preparation Example 2 was dissolved in toluene and introduced together, and the solution was reacted for 1 hour. After the reaction was finished, 0.25 mmol of the metallocene compound prepared in Preparation Example 3 was dissolved in toluene and introduced, and the solution was additionally reacted for 1 hour.

After the reaction was finished, stirring was stopped and the toluene layer was separated and removed, 1.0 mmol of anilinium borate (N, N-dimethylanilinium tetrakis(pentafluorophenyl)borate, AB) was introduced and the solution was stirred for 1 hour, and toluene was removed by pressure reduction at 50° C., thus preparing a supported catalyst.

Comparative Example 4

A Ziegler-Natta catalyst (Sigma-Aldrich) was prepared.

Comparative Example 5

Silica (manufactured by Grace Davison, SYLOPOL 948) was dehydrated at 400° C. for 15 hours under vacuum.

10 g of dried silica was put in a glass reactor, 100 mL of toluene was additionally put therein, and the solution was stirred. 50 mL of a 10 wt % methylaluminoxane (MAO)/toluene solution was added thereto, and the solution was slowly reacted at 40° C. while stirring. Thereafter, it was washed with a sufficient amount of toluene to remove an unreacted aluminum compound, and the remaining toluene was removed by pressure reduction.

Again, 100 mL of toluene was introduced, 0.5 mmol of the metallocene compound prepared in Preparation Example 1 was dissolved in toluene and introduced together, and the solution was reacted for 1 hour.

After the reaction was finished, stirring was stopped and the toluene layer was separated and removed, 1.0 mmol of anilinium borate (N, N-dimethylanilinium tetrakis(pentafluorophenyl)borate, AB) was introduced and the solution was stirred for 1 hour, and toluene was removed by pressure reduction at 50° C., thus preparing a supported catalyst.

Comparative Example 6

Silica (manufactured by Grace Davison, SYLOPOL 948) was dehydrated at 400° C. for 15 hours under vacuum.

10 g of dried silica was put in a glass reactor, 100 mL of toluene was additionally put therein, and the solution was stirred. 50 mL of a 10 wt % methylaluminoxane (MAO)/toluene solution was added thereto, and the solution was slowly reacted at 40° C. while stirring. Thereafter, it was washed with a sufficient amount of toluene to remove an unreacted aluminum compound, and the remaining toluene was removed by pressure reduction.

Again, 100 mL of toluene was introduced, 0.5 mmol of the metallocene compound prepared in Preparation Example 4 was dissolved in toluene and introduced together, and the solution was reacted for 1 hour.

After the reaction was finished, stirring was stopped and the toluene layer was separated and removed, 1.0 mmol of anilinium borate (N, N-dimethylanilinium tetrakis(pentafluorophenyl)borate, AB) was introduced and the solution was stirred for 1 hour, and toluene was removed by pressure reduction at 50° C., thus preparing a supported catalyst.

Experimental Example 1

The slurry polymerization of ethylene was conducted in the presence of each supported catalyst prepared in the examples and comparative examples, thus obtaining an ethylene homopolymer.

Specifically, 50 mg of each supported catalyst prepared in Examples 1 to 3 and Comparative Examples 1 to 6 was quantified in a dry box and each was put in a 50 mL glass bottle, which was then sealed with a rubber septum and taken out of the dry box, thus preparing a catalyst to be introduced. Polymerization was conducted in a 2 L metal alloy reactor equipped with a mechanical stirrer and used under high pressure, of which temperature could be controlled.

Into the reactor, 1 L of hexane containing 1.0 mmol triethylaluminum was introduced, and each supported catalyst prepared above was introduced into the reactor without air contact, and then, at 80° C., gaseous ethylene monomers were continuously added at a pressure of 9 kgf/cm² and polymerized for 1 hour. After stirring was stopped, ethylene was exhausted and removed, thus finishing polymerization.

After removing most of the polymerization solvents by filtration, the obtained polymer was dried in a vacuum oven at 80° C. for 4 hours.

Experimental Example 2

For the ethylene polymers prepared according to Experimental Example 1, the properties were measured as follows, and the results are shown in the following Table 1.

(1) Catalytic Activity (Kg PE/g $SiO_2$)

The catalytic activity was calculated as a ratio of the weight (kg PE) of the polymer produced per catalyst content (g $SiO_2$) used per unit time (h).

(2) Molecular Weight (Mw), Polydispersity Index (PDI), and Density (D) of Polymer Using nGPC, the weight average molecular weight (Mw), number average molecular weight (Mn), and density of the polymer were measured. The polydispersity index (PDI) was calculated by dividing the obtained Mw by Mn.

(3) Melt Index (MI) of Polymer

The melt index (MI2.16) was measured at 190° C. under a load of 2.16 kg according to ASTM D 1238, and it was indicated as the weight (g) of the polymer melted in 10 minutes. Further, the melt index (MI10) was measured at 190° C. under a load of 10 kg according to ASTM D 1238, and it was indicated as the weight (g) of the polymer melted in 10 minutes. The obtained MI10 was divided by MI2.16, thus showing the ratio (MFRR).

(4) Spiral Flow (SF, Cm)

Spiral flow of the polymer was measured according to ASTM D 2123-09.

TABLE 1

| | Precursor (Preparation Example) | Activity (kg PE/g $SiO_2$) | Mw (g/mol) | PDI | MI2.16 (g/10 min) | MFRR | D (g/cm³) | SF (cm) |
|---|---|---|---|---|---|---|---|---|
| Example 1 | 1 + 2 | 33 | 74000 | 2.8 | 8.0 | 3.5 | 0.956 | 24 |
| Example 2 | 1 + 2 + 3 | 31 | 83000 | 3.1 | 7.7 | 3.3 | 0.955 | 23 |
| Example 3 | 1 + 3 | 27 | 79000 | 3.0 | 7.7 | 3.4 | 0.956 | 23 |
| Comparative Example 1 | 4 + 2 | 20 | 78000 | 3.2 | 5.6 | 3.1 | 0.957 | 21 |
| Comparative Example 2 | 4 + 2 + 3 | 19 | 83000 | 3.2 | 4.9 | 3.1 | 0.956 | 21 |
| Comparative Example 3 | 2 + 3 | 20 | 82000 | 3.4 | 7.5 | 3.0 | 0.957 | 20 |
| Comparative Example 4 | Z/N | 18 | 72000 | 4.8 | 7.5 | 1.6 | 0.957 | 18 |
| Comparative Example 5 | 1 | 10 | 10000 | 1.0 | 20.1 | 2.5 | 0.955 | 38 |
| Comparative Example 6 | 4 | 7 | 15000 | 1.4 | 15.0 | 3.1 | 0.955 | 34 |

Referring to Table 1, it was confirmed that the supported hybrid catalyst systems of Examples 1 to 3 exhibit remarkably higher polymerization activities, compared to the catalyst systems of Comparative Examples 1 to 6.

Particularly, the supported hybrid catalyst systems of Examples 1 to 3 can provide an ethylene polymer that has a high molecular weight and a narrow molecular weight distribution but has excellent processability.

The invention claimed is:

1. A supported hybrid catalyst system for ethylene slurry polymerization, comprising
a carrier and three or more kinds of metallocene compounds supported on the carrier,
wherein the three or more kinds of metallocene compounds comprise at least one metallocene compound having the following structural formula:

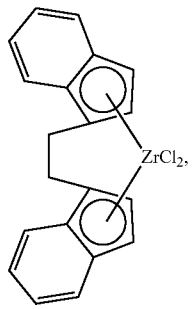

at least one metallocene compound represented by the following structural formula:

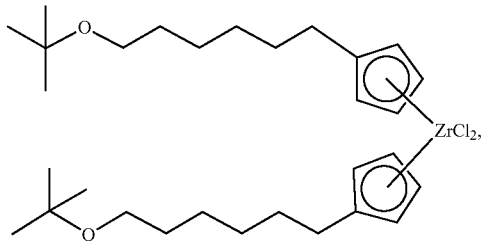

and at least one metallocene compound selected from the group consisting of compounds represented by the following structural formulas:

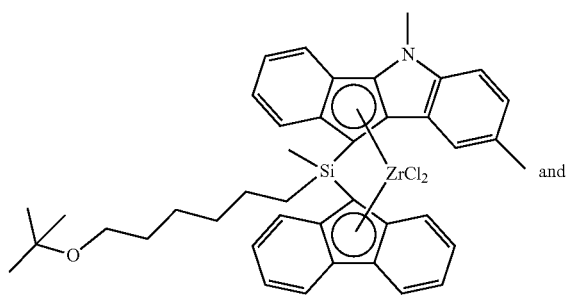

and

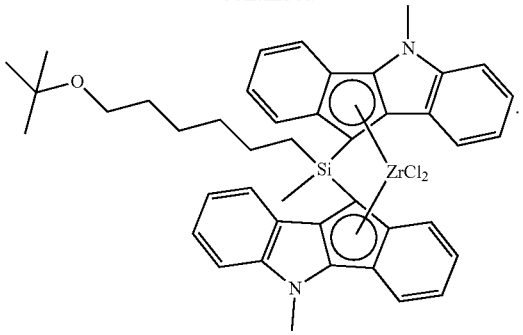

2. The supported hybrid catalyst system for ethylene slurry polymerization according to claim 1, wherein the supported hybrid catalyst system further comprises one or more cocatalysts selected from the group consisting of compounds represented by the following Chemical Formulas 7 to 9:

$$—[Al(R^{71})—O]_c—$$ [Chemical Formula 7]

wherein, in Chemical Formula 7,
c is an integer of 2 or more; and
each $R^{71}$ is each independently a halogen, or a C1-20 hydrocarbyl or C1-20 hydrocarbyl substituted with a halogen, $$D(R^{81})_3$$ [Chemical Formula 8]

wherein, in Chemical Formula 8,
D is aluminum or boron; and
each $R^{81}$ is independently a halogen, or a C1-20 hydrocarbyl or C1-20 hydrocarbyl group substituted with a halogen, $$[L-H]^+[Q(E)_4]^-$$ [Chemical Formula 9]

wherein, in Chemical Formula 9,
L is a neutral Lewis base;
$[L-H]^+$ is a Bronsted acid;
Q is boron or aluminum in an oxidation state of +3; and
each E is independently a halogen having a hydrogen valence of one or more, or a C6-20 aryl or C1-20 alkyl unsubstituted or substituted with a C1-20 hydrocarbyl, alkoxy, or phenoxy functional group.

3. The supported hybrid catalyst system for ethylene slurry polymerization according to claim 2, wherein the cocatalyst is one or more selected from the group consisting of trimethyl aluminum, triethyl aluminum, triisopropyl aluminum, triisobutyl aluminum, ethylaluminum sesquichloride, diethylaluminum chloride, ethyl aluminum dichloride, methylaluminoxane, and modified methylaluminoxane.

4. A method for preparing an ethylene polymer, comprising the step of slurry polymerization of olefin monomers including ethylene in the presence of the supported hybrid catalyst system according to claim 1.

5. The method for preparing an ethylene polymer according to claim 4, wherein the ethylene polymer has a weight average molecular weight (Mw) of 50,000 to 150,000, a polydispersity index of 2.5 to 3.5, a melt index of 7.0 to 8.5 g/10 min (190° C., 2.16 kg), and a spiral flow of 20 to 30 cm measured according to ASTM D 3123-09.

* * * * *